United States Patent [19]
Tart
[11] 4,029,955
[45] June 14, 1977

[54] LUMINAIRE FILTER MATERIAL

[75] Inventor: David K. Tart, Lenox, Mass.
[73] Assignee: General Electric Company, New York, N.Y.

[22] Filed: May 9, 1975
[21] Appl. No.: 575,991

Related U.S. Application Data

[62] Division of Ser. No. 440,698, Feb. 8, 1974, abandoned.

[52] U.S. Cl. .................................. 240/25; 55/387; 55/522; 240/47; 428/280
[51] Int. Cl.² .................... F21S 13/10; B01D 39/00
[58] Field of Search ............ 55/387, 522, 527, 528; 210/50; 423/447, 447.1–447.9; 240/25, 47; 428/113, 280, 281

[56] References Cited

UNITED STATES PATENTS

| | | | |
|---|---|---|---|
| 2,826,265 | 3/1958 | De Woody | 55/522 |
| 3,348,035 | 10/1967 | Franklin et al. | 240/25 |
| 3,508,874 | 4/1970 | Rulison | 423/447 |
| 3,577,705 | 5/1971 | Sharlit | 55/4 R |
| 3,744,534 | 7/1973 | Henry et al. | 423/447 X |
| 3,815,338 | 6/1974 | Lenane | 55/527 X |
| 3,818,082 | 6/1974 | Burns et al. | 423/447 |
| 3,833,804 | 9/1974 | Vesely | 240/25 |
| 3,878,505 | 4/1975 | Seibert | 240/25 |

OTHER PUBLICATIONS

Plastics in Filtration, Jones, in Filtration and Separation, May/June 1970, pp. 303, 306–309.
New Safety Fabric–in Product Engineering 8/3/1970, p. 26.

*Primary Examiner*—Edna M. O'Connor
*Attorney, Agent, or Firm*—Sidney Greenberg

[57] ABSTRACT

Air filter material suitable for use as a gasket in luminaires comprises a composite air-permeable felt made of a carbonized fiber material intermingled with a non-carbonized high temperature resistant fiber material.

4 Claims, 2 Drawing Figures

LUMINAIRE FILTER MATERIAL

This is a division of application Ser. No. 440,698 filed Feb. 8, 1974, now abandoned and assigned to the same assignee as the present invention.

The present invention relates to air filters and particularly concerns an improved air filter material for use in luminaires for protecting the optical system of the luminaire from entry of atmospheric contaminants.

It is an object of the invention to provide an air filter material having improved capability for removal of contaminants, especially of gaseous type, from the atmosphere.

It is another object of the invention to provide an air filter material of the above type which is suitable for use as a gasket in electrical luminaires.

Another object of the invention is to provide a method of making an improved filter material of the above type.

A particular object of the invention is to provide a luminaire having an air filter of the above type, and particularly such a filter in the form of a gasket between the parts of the optical system thereof.

Other objects and advantages will become apparent from the following description and the appended claims.

With the above objects in view, the present invention in one of its aspects relates to an air filter material comprising a composite air-permeable felt comprising intermingled first and second fiber materials, the first fiber material composed of a high temperature resistant material, and said second fiber material comprising an organic material and being substantially carbonized, whereby the composite felt is adsorptive of gaseous and particulate contaminants in the air.

Figure 1:
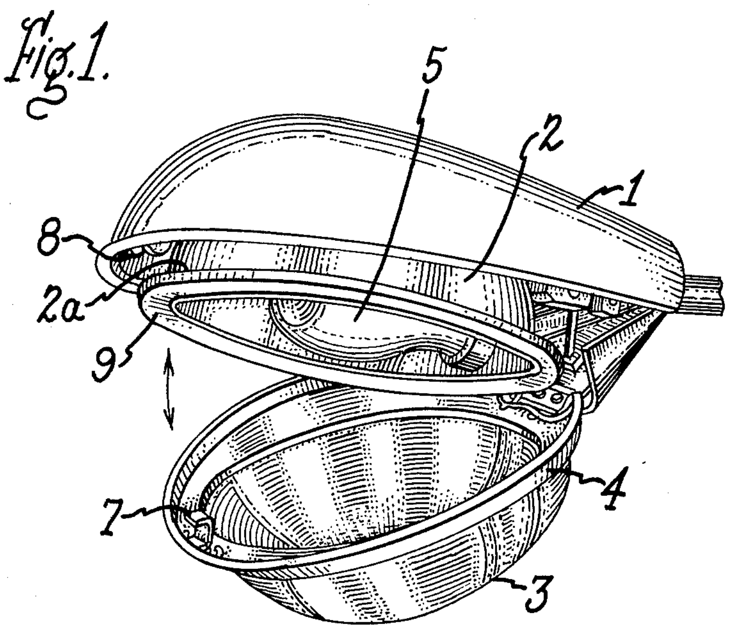
Figure 2:
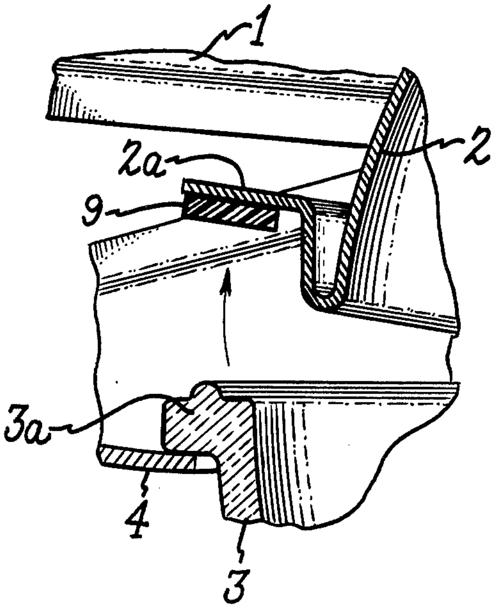

The invention will be better understood from the following description taken in conjunction with the accompanying drawing, in which:

FIG. 1 is a perspective view of a luminaire equipped with a gasket filter in accordance with an embodiment of the invention; and FIG. 2 is an enlarged detailed view of the gasket filter arrangement in the luminaire shown in FIG. 1.

Referring now to the drawing and particularly to FIG. 1, there is shown a street lighting luminaire in which the invention is embodied and which comprises an upper housing 1 mounted at its rear end on a horizontal support. Arranged within the front portion of housing 1 is a concave reflector 2 typically made of aluminum and having a specular interior reflecting surface facing downwardly toward the bottom of the housing. Reflector 2 has a bottom flange **2*a* extending around its opening and is secured to the interior housing 1 by suitable means (not shown). Lamp 5, typically a high-intensity gaseous discharge lamp, is suitably arranged within reflector 2. The open bottom of housing 1 is closed by refractor 3 mounted in an annular frame member 4 hingedly connected at its rear to housing 1. Frame member 4 is releasably attached at its front end by latch lever 7 on frame member 4 co-acting with latch plate 8 on housing 1. Refractor 3 is formed with an annular flange 3*a* (see FIG. 2) which in the closed position of frame member 4 comes into mating relation with reflector flange 2*a* and with air-permeable gasket filter 9** compressed therebetween.

In accordance with the invention, gasket 9 is formed of a composite fiber material which has improved filtering and other properties which make it eminently suitable for use as a combined gasket and filter in a luminaire such as shown, wherein the gasket filter in compressed condition is subjected to relatively high operating temperatures developed in the luminaire by lamp 5 and other luminaire components. In a preferred embodiment of the invention, the gasket material is formed of an air-permeable composite fiber felt comprising a non-carbonized high temperature resistant synthetic resin fiber material, such as Dacron or Nomex, intermingled with a carbonized synthetic resin fiber material, such as Kynol. Dacron is the trademark for a polyester fiber made of polyethylene terephthlate and has a melting point of about 250° C. Nomex is the trademark for a heat resistant polyamide resin of nylon type and is composed of a copolymer of meta-phenylenediamine and isophthaloyl-chloride. Kynol is the trademark for a flame-resistant synthetic resin fiber composed of a thermosetting cross-linked phenol-formaldehyde polymer; it will not ignite up to 2500° C but will char slowly at 250° C. The carbonized fiber material in the composite felt serves to effectively adsorb gaseous contaminants in the air, and the non-carbonized high temperature resistant fiber provides support and reinforcement to the carbonized fibers for improving the strength of the composite material. The carbonized fiber component provides for effective removal of gaseous contaminants not only by virtue of its carbon composition which readily adsorbs such gaseous impurities, but also because the carbonization treatment results in increased surface area of the carbonized fiber available for such adsorption, as more fully explained below.

The high temperature resistant fiber material should be such that it does not soften or otherwise deteriorate under prolonged exposure to the operating temperatures of the luminaire in which the gasket filter is incorporated. Thus, in luminaires having 250 watt lamps, such material should be resistant to a temperature of about 100° C, whereas the fiber used with 400 watt lamps should withstand about 120° C, and with 1000 watt lamps it should withstand about 150 ° – 160 ° C operating temperatures.

In the composite felt, the high temperature reinforcing fiber component, e.g., the Dacron or Nomex, in the broad aspects of the invention may be present in the range of 5 – 95% by weight, and the carbonized fiber, e.g., Kynol is in the range of 95 – 5% by weight. Where the felt is to be used as a compressible gasket, the preferred ranges are 30 – 90% of the reinforcing fiber and 10 – 70% of the carbonized fiber. In a particularly preferred composition, the felt contains a mixture of about 50% Nomex or Dacron and about 50 % carbonized Kynol fiber.

The manner in which the composite filter material is made may differ, depending on the nature of the reinforcing fiber component used. Thus, a composite felt may be made by intermingling fibers of Nomex and Kynol in the desired proportions and then heating the composite material at a temperature of about 250° – 350° C for the purpose of carbonizing the Kynol fibers in situ in the mixture. While this procedure is satisfactory when Nomex is used, it is not practical when Dacron is used, since the latter will soften excessively or melt at the carbonizing temperature. Where Dacron is to be used instead of Nomex, because of its lower cost or for other reasons, the Kynol or other carbonizable fiber component is separately carbonized by suitable heat treatment and is then intermingled with the Dacron fiber component to form the composite filter material. The latter procedure may also be used, of course, when Nomex or other high temperature reinforcing fibers are employed. In such procedure, the carbonizable fiber is typically heated at a temperature of about 400 – 600 ° C to carbonize the same, and at such temperatures the carbonization process proceeds more rapidly than at the lower temperature used in the previously described in situ process. It may, in certain circumstances, be preferable to carbonize the Kynol fiber component separately because, as a result of the higher carbonizing temperature which can be used, a greater surface area on the fiber material is provided, thereby enhancing the adsorptive properties of the carbonized fibers.

As will be understood, fiber materials other than the above mentioned materials may be employed in the broad aspects of the invention. For example, the reinforcing fiber material may comprise suitable metallic or glass fiber material, or organic or synthetic resin fiber material other than Nomex or Dacron. For example, under suitable conditions, such as where operating temperatures of not substantially higher than about 100 ° C will prevail, uncarbonized Kynol fibers or fibers of such compounds as polyvinyl chloride and polypropylene may be used as the reinforcing fiber component in conjunction with adsorptive carbonized Kynol fibers as described above. As used herein, the reference to high temperature resistant fiber material is intended to mean such materials which do not melt or otherwise deteriorate at a temperature of at least about 100° C.

Further, while Kynol has been found particularly satisfactory for use in the present invention, other carbonizable fiber materials may be employed, as for example, polyvinylidene chloride, polyacrylonitrile, and cellulosic materials. Where a polyamide type of fiber such as nylon or Nomex is used as the reinforcing fiber component, and it is desired to carbonize the other fiber component in situ in the composite felt, the latter fiber material should be such as to be carbonizable at a temperature below about 350° C to avoid degrading the reinforcing fiber material.

In a typical process which may be used in practicing the invention, Kynol fibers are carbonized by placing them in an oven at a temperature of 500° C in a nitrogen or other inert gas atmosphere, the heating being carried out for about 15 minutes. The hot carbonized fibers are removed from the oven and allowed to cool in air. This procedure results in a reaction between the oxygen in the air and the hot carbonized fibers which causes etching of the fiber surfaces, producing markedly increased surface area.

If desired, other methods may be used to increase the fiber surface area, such as treatment with chemical etching solutions, exposure of the fibers to moist air at elevated temperature, or other procedures.

Thereafter, the carbonized Kynol fibers are mixed with the high temperature fibers, e.g., Dacron, by "felting" or intermingling the two fiber materials together, such as by known needling procedures, the final felt material typically having a thickness of about ½ inch.

The gasket filter strip 9 produced in accordance with the invention may be attached to reflector flange 2*a* by any suitable means, such as by the use of suitable adhesive materials. Mechanical attaching means of various types may also be used, if desired.

While the composite filter material has been described as embodied in a gasket in a luminaire, it may be used in other forms in the luminaire. The composite filter material may be used, for example, in a filter cartridge or plug arranged in a luminaire optical system as disclosed in the U.S. Pat. No. to Milroy 3,457,399, or in a filter holder device as disclosed in the U.S. Pat. No. to Osteen 3,695,009.

A permeable air purifying filter made in accordance with the invention and arranged in the otherwise airtight optical system of a luminaire to permit passage of air into and out of the optical system removes dust, dirt and other contaminants of gaseous or particulate nature which may be contained in the air, and which would adversely affect the illuminating level of the optical system, such as by forming dulling films, depositing materials corrosive to or discoloring the reflecting surface of reflector 2, or otherwise interfering with the function of refractor 3, reflector 2 and lamp 5. By virtue of the improved composite filter material of the invention, the deleterious effects of such contaminants are reduced to a remarkable degree, and the initially high level of illumination afforded by the luminaire is maintained over a long period of time, even in heavily contaminated atmospheres in industrial, smog and similar environments. There is also avoided thereby the frequent cleaning of the optical system such as found necessary with ordinary luminaires installed in such environments.

It is evident that the composite filter material may also be found useful for other air filtering applications, such as in automobile and building air ventilating systems, or other air flow apparatus, for removing both gaseous and particulate contaminants from the air.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. In a luminaire, an optical system comprising a reflector and a light transmitting closure defining a closed optical enclosure, means for mounting a lamp in said enclosure, and air-permeable, gas adsorbent filter means arranged on said optical enclosure communicating with the interior thereof for filtering air passing thereinto by removal of solid and gas impurities contained in the air, said filter means comprising a compressible composite felt comprising intermingled first and second fiber materials, said first fiber material composed of a high temperature resistant material, and said second fiber material comprising an organic material and being substantially carbonized, whereby said composite felt is adsorptive of gaseous and particulate contaminants in the air.

2. A device as defined in claim 1, wherein said first fiber material comprises a synthetic resin selected from the group consisting of polyesters and polyamides, and said second fiber material comprising a phenol-formaldehyde polymer.

3. A device as defined in claim 2, wherein said synthetic resin is selected from the group consisting of polyethylene terephthalate and the copolymer of metalphenylenediamine and isophthaloyl-chloride.

4. A device as defined in claim 2, said composite felt being arranged as a gasket compressed between said reflector and said light transmitting closure.

* * * * *